United States Patent [19]

Heilper et al.

[11] Patent Number: 6,014,450
[45] Date of Patent: Jan. 11, 2000

[54] METHOD AND APPARATUS FOR ADDRESS BLOCK LOCATION

[75] Inventors: Andrei Heilper, Haifa; Daniel Sever, Kiryat Tivon; Ziva Sommer, Haifa; Eugene Walach, Kiryat Motzkin, all of Israel

[73] Assignee: International Business Machines Corporation, Armonk, N.Y.

[21] Appl. No.: 08/814,212

[22] Filed: Mar. 11, 1997

[30] Foreign Application Priority Data

Mar. 12, 1996 [GB] United Kingdom .................... 9605207

[51] Int. Cl.⁷ ...................................................... G06K 9/00
[52] U.S. Cl. ............................ 382/101; 382/176; 209/584
[58] Field of Search ..................................... 382/101, 102, 382/176, 178; 209/584

[56] References Cited

U.S. PATENT DOCUMENTS

| | | | |
|---|---|---|---|
| 4,516,265 | 5/1985 | Kizu et al. ............................... | 382/102 |
| 5,038,381 | 8/1991 | Nelson ..................................... | 382/178 |
| 5,337,370 | 8/1994 | Gilles et al. ............................. | 382/101 |
| 5,581,628 | 12/1996 | Nakamura et al. ...................... | 382/101 |
| 5,642,288 | 6/1997 | Leung et al. ............................ | 382/112 |
| 5,754,671 | 5/1998 | Higgins et al. .......................... | 382/101 |
| 5,761,686 | 6/1998 | Bloomberg .............................. | 382/232 |

OTHER PUBLICATIONS

Palumbo et al. "Postal address block location in real time" IEEE Computer 1992 pp. 34–42, Jul. 1992.
Chai et al. "Extraction of text boxes from engineering drawings" Proc. of SPIE—The international society for optical engineering (1992) vol. 1661, pp. 38–49, Feb. 1992.
Liu et al. "An objec attribute thresholding algorithm for documetn image binarization" IEEE Document analysis and recognition 1993 pp. 278–281.
Sakoda et al. "Refinement and testing of a character recognition sstem based on feature extraction in grayscale space" IEEE Document analysis and recognition 1993 p. 464469.
Jain etal. " Address block location on envelopes using gabor gilters: supervised method" IEEE Document analysis and recognition 1992 pp. 264–266.
Olivier et al "A robust and multiscale decumetn image segmentation for block line/text line structures extraction" IEEE Document analysis and recognition 1994 pp. 306–310.
J. C. Oriot et al "Address Block Location on Flat Mail Pieces by Bottom Up Segmentation," Trait. Signal (France) vol. 12, No. 2 (1995) pp. 213–223 (1995) (French Language).
A.C. Downton et al "Pre–Processing of Envelope Images for Optical Character Recognition," Proc. Ninth International Conference on Pattern Recognition, Nov. 14–17, 1988, pp. 27–31.

*Primary Examiner*—Amelia Au
*Assistant Examiner*—Jingge Wu
*Attorney, Agent, or Firm*—Norman L. Gundel

[57] ABSTRACT

The invention locates address indicia on digitized images of mail pieces by dividing the mail piece images into blocks; identifying rows of blocks that are adjacent along a first direction and that have similar defined image features by comparing such image features within adjacent blocks; assembling at least some of the identified rows of blocks that are adjacent along a second direction perpendicular to the first direction into address block candidate regions; and selecting the address block by scoring the various address block candidate regions on the basis of defined criteria. The criteria initially score the candidate regions based on closeness to the center of the rectangle and then reduce this initial score if an edge of the region is close to an edge of the image, the region contains a small or very high number of text rows, or the aspect ratio between the width and height of the region is high. This provides an Address Block Location (ABL) technique which is capable of being implemented for real time operation on presently available general purpose computers.

27 Claims, 6 Drawing Sheets

METHOD AND APPARATUS FOR ADDRESS BLOCK LOCATION

BACKGROUND OF THE INVENTION

1. Field of the Invention

The present invention relates to machine recognition of images and, more particularly, to techniques for locating address blocks in digitized images of mail pieces for subsequent processing by optical character recognition (OCR) techniques.

2. Description of the Related Art

Due to the ever increasing volumes of mail being handled by the world's post offices and commercial delivery organizations, automated handling and sorting of mail pieces is increasingly being employed. Automated address recognition using optical character recognition (OCR) techniques is an important part of any such sorting process.

In order to allow efficient address recognition, it is necessary to know where address information is located in an image of an entire mail piece.

Consequently much effort has been directed to the development of so-called Address Block Location (ABL) techniques. This is a difficult image recognition task because there are no tight rules which determine either where an address will be located on an envelope, or the shape or size of the address. Furthermore, a wide variety of extraneous data such as portraits, other text and logos, as well as stamps, labels and postmarks, may also be found on an envelope and confuse the matter. Moreover, in many cases, more than one address, for example sender and receiver addresses, may appear on an envelope.

In addition, problems in image acquisition may give rise to poor image quality. For example, colored backgrounds may cause distortion or loss of information and use of cellophane windows may increase the reflectivity of the address area. Likewise, noise, dirt and poor scanning can produce low image quality.

Examples of various prior art ABL techniques can be found in P. W. Palumbo et al "Postal Address Block Location in Real Time," IEEE Computer, Vol 25, No 9, pp 34–42 (1992), J. C. Oriot et al "Address Block Location on Flat Mail Pieces by a Bottom Up Segmentation," Trait. Signal (France) Vol 12, No 2 (1995) pp 213–223 (1995), and A. L. Basso et al U.S. Pat. No. 5,386,482. A. C Downton et al "Pre-Processing of Envelope Images for Optical Character Recognition," Proc. Ninth International Conference on Pattern Recognition, Nov. 14–17, 1988, pp 27–31, proposes an ABL technique which includes horizontal and vertical smearing of low resolution envelope images followed by a heuristic selection of an address block.

Typically, the prior art as exemplified in the above referenced articles and other papers to which they refer has employed computationally intensive processes such as connected component analysis or OCR in order to identify text areas. These are costly procedures, even for a low-resolution image, and such a heavy computational load has generally led to the use of special purpose hardware for address block location in commercial applications. Furthermore, such algorithms are very sensitive to noise and consequently preprocessing to remove noise from the image is required, which preprocessing can potentially remove useful information from the image.

SUMMARY OF THE INVENTION

It is the object of the present invention to provide an improved ABL technique which is capable of being implemented for real time operation on presently available general purpose computers.

The invention locates address indicia on digitized images of mail pieces by dividing the mail piece images into blocks; identifying rows of blocks that are adjacent along a first direction and that have similar defined image features by comparing such image features within adjacent blocks; assembling at least some of said identified rows of blocks that are adjacent along a second direction perpendicular to said first direction into address block candidate regions; and selecting an address block candidate region on the basis of defined criteria.

This provides a faster ABL technique because no use of computationally expensive techniques such as connected component analysis or OCR is required. Furthermore, once the image has been divided into blocks, the need to access the actual image data is reduced, as much of the processing may be performed at the block level.

The defined image features can comprise a pen width estimator determined based on run lengths within the blocks. In the preferred embodiment, the median of the run lengths within the block is used. This method is based on the premise that text within an address block will usually be printed or written with a uniform line width. Preferably, the first direction is parallel to the direction of rows of text in an address.

The present method is particularly, but not exclusively, concerned with binary images. However, it will be appreciated that analogous techniques may be applied to grayscale images using other image features common to text lines within an address.

In one embodiment the method comprises identifying blocks likely to contain text on the basis of image features within the block and the step of identifying the horizontally adjacent blocks is carried out using a region growing process starting with a block identified as likely to containing text. In a preferred implementation, a trainable pattern classifier is used to identify blocks likely to contain text.

The invention also provides an address block location system arranged to locate address indicia on digitized images of mail pieces using the above described method.

BRIEF DESCRIPTION OF DRAWINGS

The novel features believed characteristic of the invention are set forth in the appended claims. The invention itself, however, as well as a preferred mode of use, further objects and advantages thereof, will best be understood by reference to the following detailed description of an illustrative detailed embodiment and when read in conjunction with the accompanying drawings, wherein:

While the invention will be described in connection with a preferred embodiment and process, the description is not intended to limit the invention to that embodiment. On the contrary, the invention is intended to cover all alternatives, modifications and equivalents as may be included within the spirit and scope of the invention as described by the appended claims.

DETAILED DESCRIPTION OF THE INVENTION

Figure 1:
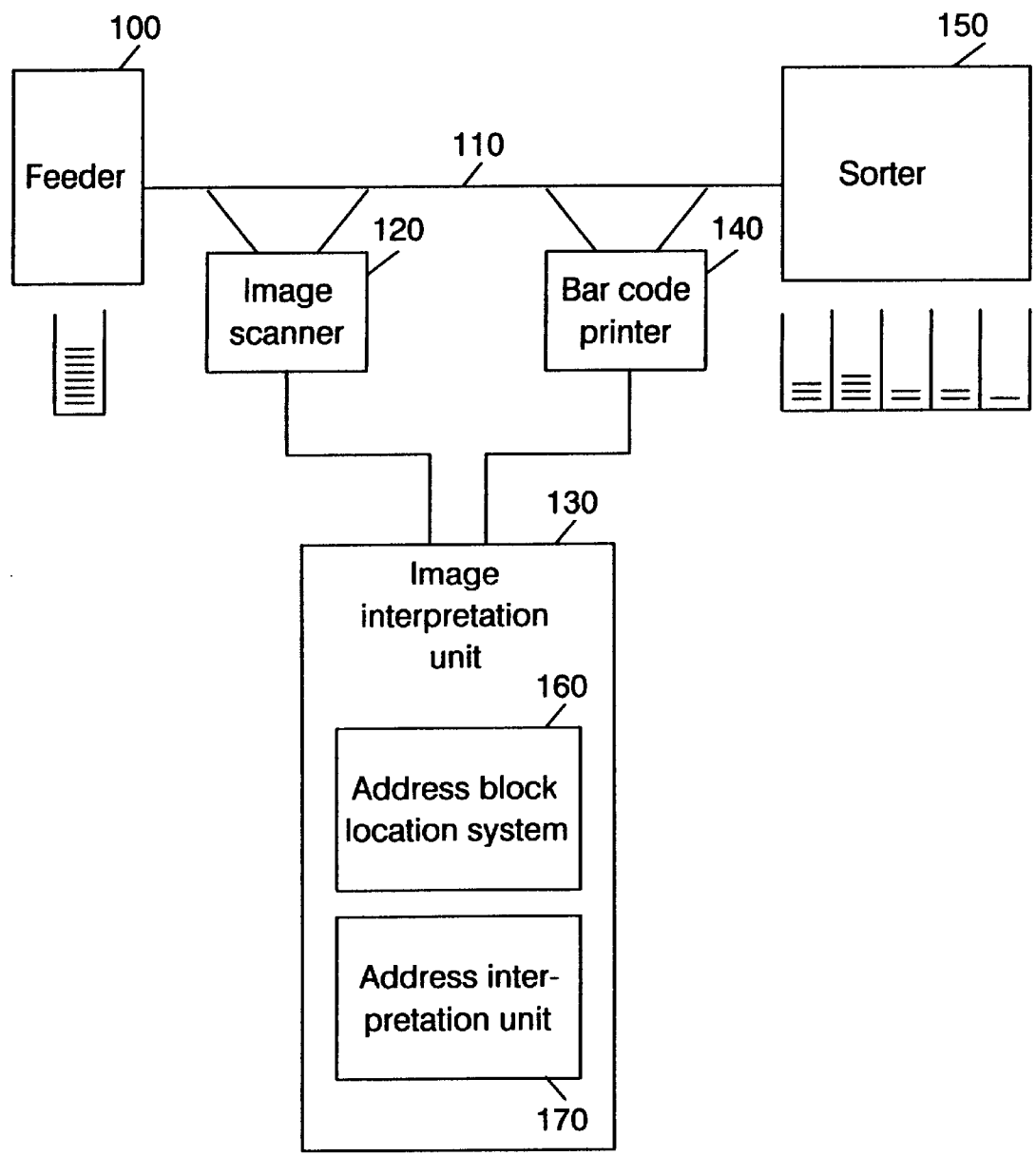
FIG. 1 is a schematic diagram showing a postal OCR system.

FIG. 1 is a schematic diagram showing a postal OCR system. The system comprises a feeder 100 which passes mail pieces onto a conveyor or transport system 110. An image scanner 120 captures an image of each mail piece as it passes on the conveyor. The captured image is passed to an image interpretation unit 130 in which the destination address is recognized and encoded into a bar code format which is then printed onto the mail piece by bar code printer 140 further down the conveyor. The mail pieces are then sorted by a sorter 150 according to the bar codes.

Image interpretation unit 130 includes two main subsystems, address block location system 160 and address interpretation unit 170. Address block location system 160 locates an address block within the image of the entire mail piece. Address interpretation system 170 takes this address image and interprets it using OCR in conjunction with suitable correction and/or disambiguation techniques.

This invention is primarily concerned with the address block location system 160.

Image scanner 120 may be, for example, a charge coupled device (CCD) based image capture camera. Such a device generates an electronic signal representative of the markings on a mail piece. The signal from the image capture camera 120 is passed to image interpretation unit 130. The image is digitized, preferably in the form of a bi-level bitmap comprising rows and columns of binary pixels, and stored in a suitable format in a data storage device (not shown) within the image interpretation unit 130.

Figure 4:
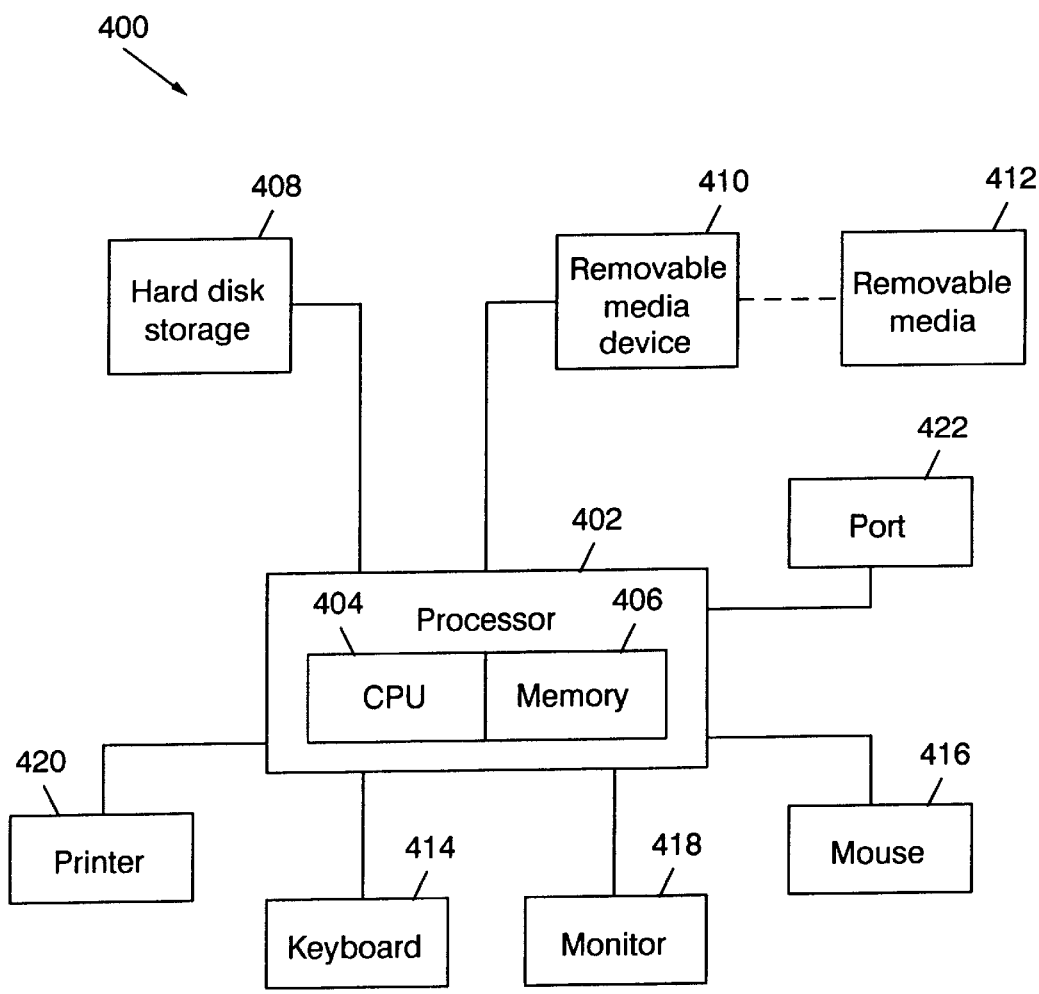
FIG. 4 is a block diagram of a computer workstation which may be used in performing the method of a preferred embodiment of the present invention and forming a part of the apparatus of a preferred embodiment of the present invention.

Turning to FIG. 4, it may be seen that, in this embodiment, image interpretation unit 130 is a data processing system such as a general purpose computer workstation 400. Computer workstation 400 is of conventional type which operates under the control of suitable programs to carry out the image processing and recognition tasks described herein. Computer workstation 400 is preferably an IBM RISC System/6000 computer running the IBM AIX/6000 operating system, as shown in block diagram form in FIG. 4. (IBM, RISC System/6000 and AIX/6000 are trademarks of IBM Corp.)

Computer workstation 400 includes a processor 402, which includes a central processing unit (CPU) 404 and memory 406. Additional memory, such as a hard disk storage 408 and at least one removable media device 410 may be connected to the processor 402. Each removable media device 410 may read from and, preferably, write to removable media 412. Removable media 412 may be any computer readable media, including magnetic and optical media such as diskette media or compact disk—read only memory. Removable media 412 may have computer program code recorded thereon that implements portions of the present invention in the computer workstation 400. The computer workstation 400 may also includes interface hardware, such as a keyboard 414 and a pointing device such as a mouse 416, for allowing user input to the computer workstation 400. The computer workstation 400 may also includes visual display devices, such as a monochrome or color display monitor 418 and a monochrome or color display printer 420, for rendering visual information. The computer workstation 400 may also include input/output ports such as port 422 for communication with other devices such as image scanner 120, bar code printer 140 and address interpretation unit 170.

It will also be understood, however, that the invention may be implemented in the form of hardware using specially designed circuits or using any combination of special or general purpose hardware or software.

Figure 2:
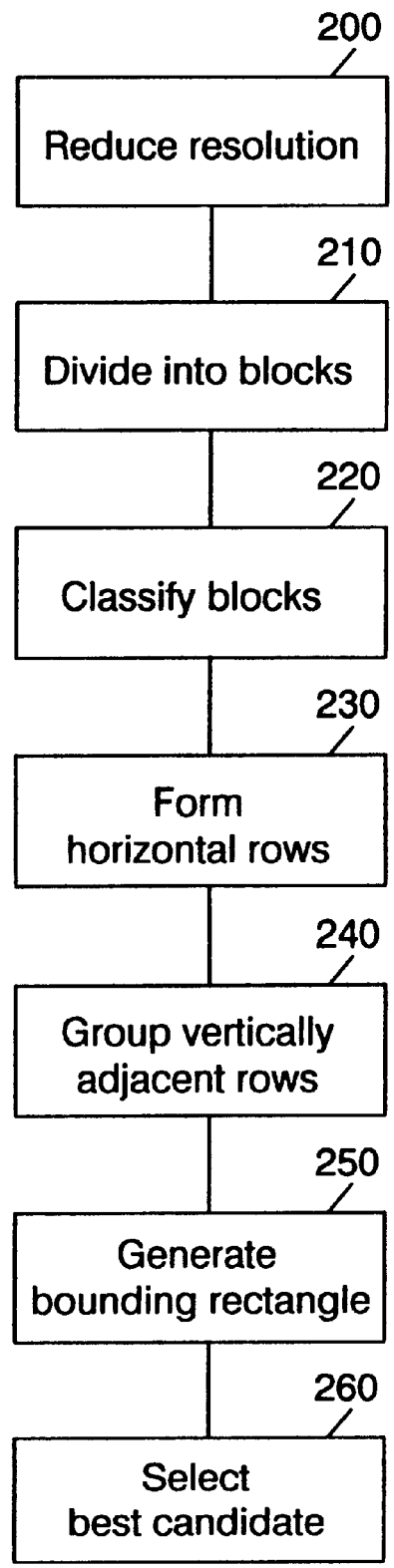
FIG. 2 is a flow diagram showing an address block location process.

FIG. 2 is a flow diagram showing the main steps of the preferred address block location process employed by the preferred address block location system 160. The preferred resolutions described illustrate the preferred process.

A binary input image of an envelope scanned at 240 dpi made up of 2160×1440 pixels, as is typically produced by commercially available mail piece scanning apparatus such as mail scanner 120, is reduced in step 200 via a subsampling process first to a low resolution image of 540×360 pixels (60 dpi). Of course other resolutions are possible, for example preferably within the range 50–100 dpi, to give a suitable compromise between acceptable accuracy of location and speed of processing.

This low resolution image is divided into blocks in step 210. In the preferred embodiment the block dimension is 15×15 pixels, but dimensions in the preferred range from 10 to 20 pixels have also been found to work for envelopes scanned at 240 dpi and subsampled to 60 dpi. Each block is stored in a run-length encoded format, thereby effectively avoiding, in conventional fashion, processing of blocks with no black pixels.

In this embodiment, the blocks are non-overlapping, but it will be appreciated that in other implementations overlapping blocks may equally be used.

A vector of features is constructed for each block based on the image content within the block. In the preferred implementation, the feature vector has 23 features as follows:

v0—number of black pixels in the block;
v1—Median of the horizontal run length distribution for runs of black pixels within the block. Edge effects are ignored, i.e. runs that start in one block and end in another are assumed to be cut.
v2—Average length of black runs in the block;
v3—Median of the vertical run length distribution for vertical black runs in the block;
v4—Horizontal run length variance estimator $$v2 = \sum_{horizontal runs} \{|(x\text{-}median)|\}/n$$

where n is the number of runs and x is the run-length;
v5—Vertical run length variance estimator $$v5 = \sum_{vertical runs} \{|x\text{-}median|\}/n$$

v6—Horizontal registration factor: correlation between original block and the block shifted horizontally by 2xvl;
v7—Vertical registration factor: correlation between original block and the block shifted vertically by 2xv2;
v8–v22—Histogram of the horizontal run length in the block.

The horizontal and vertical registration factors v6 and v7 are preferably chosen to emphasizes features or correlations in the image which are larger than the pen width.

The vector is fed into a trainable pattern classifier in step 220. The classifier is implemented as the neural network classifier described in E Yair, A Gersho "The Boltzmann Perceptron Network—a Soft Classifier," Journal of Neural Networks, Vol.3, 203–221, March 1990 [R1], and is arranged to process the feature vector.

The Boltzmann Perceptron Classifier (BPC) described in R1 is a neural network based classifier which accepts a feature vector x of dimension k at its input and supplies the M output probability values: Pr(m), m=1, . . . ,M, where M is the number of classes, and Pr(m) is the probability that the input vector x belongs to class m. The output probability values satisfy the condition: Pr(1)+Pr(2)+. . . +Pr(M)=1.

This type of classification is called soft classification because the classifier does not choose a certain class to be associated with the input vector, but rather supplies all the probabilities of the input to be a member of each of the classes. The user of the classifier may use this information to choose the best class as the most probable class.

A detailed description of the BPC and its operation and training are given in R1, the contents of which is herein expressly incorporated by reference as if set out fully herein.

Those skilled in the art will recognize that there exist other trainable pattern classifiers which may equally be used for this application. Similarly, other feature sets may be used.

The function of the classifier is to classify each input block as being either "TEXT" or "OTHER." It will be recognized that, in some special cases, it may be possible to identify blocks likely to contain text from image features alone. For example it may in some circumstances be possible to extract a signature from a text font which is known to be used for the address.

Figure 3A:
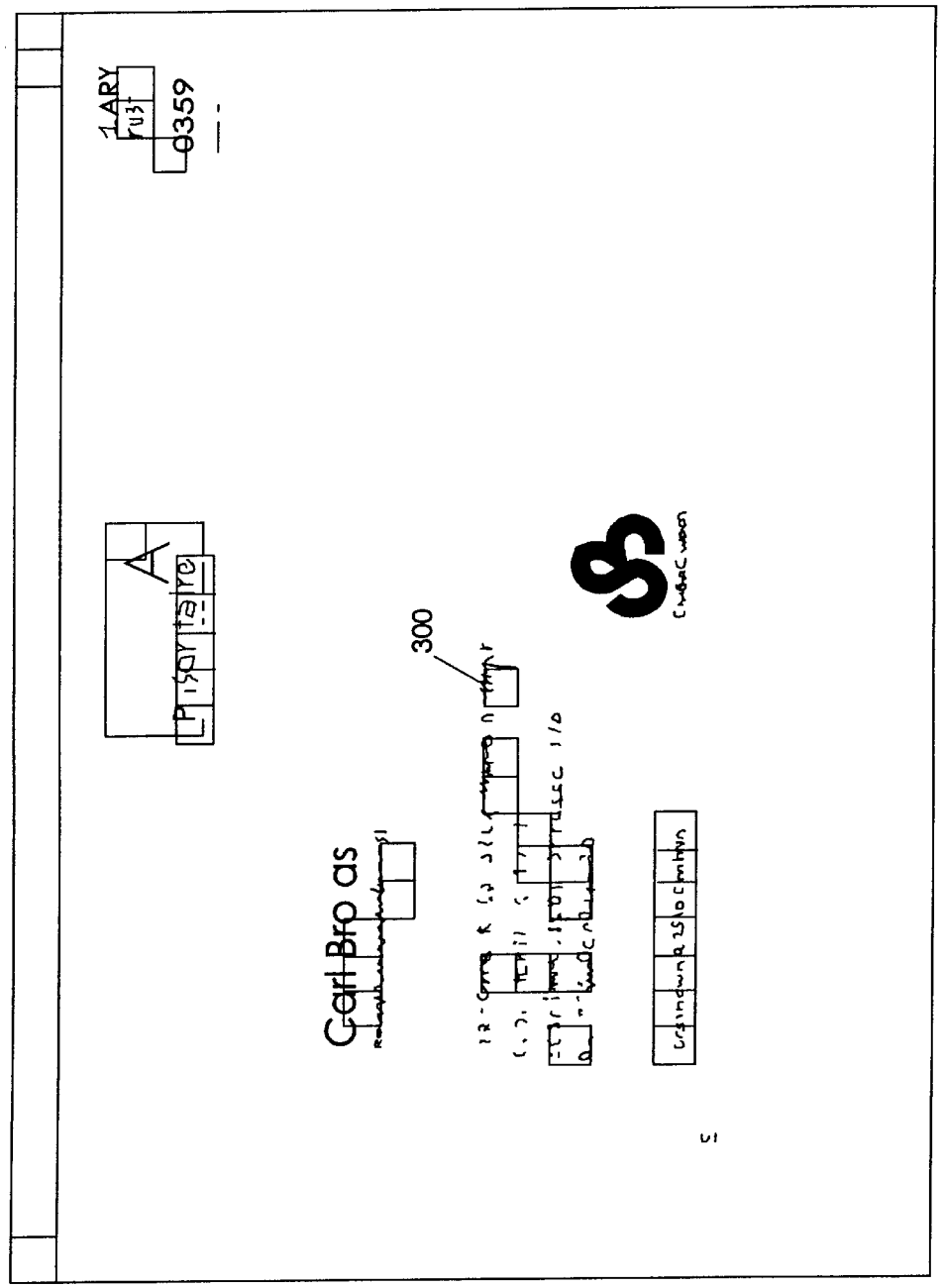
FIGS. 3A, 3B and 3C show envelope images which illustrate stages of the address block location process.

FIG. 3A shows an envelope image. Blocks classified as TEXT—for example block 300—are marked in outline.

Those blocks which are classified as "TEXT" are used as seeds for a region growing process which identifies rows of horizontally adjacent blocks having similar pen width estimators. This is based on the premise that text within an address block will usually be printed or written with a uniform line width.

It will be understood that the words "horizontally" and "vertically" used in connection with this embodiment refer respectively to directions aligned with and perpendicular to the direction in which text lines in an address are conventionally written. It will be understood that, in for instance some east Asian languages, the direction in which text lines are written actually may be vertical with respect to an envelope and that for this or other reasons, it may be possible to reverse these directions in other embodiments of the present invention.

In this embodiment, the median of the run length distribution inside the block, i.e. feature v1, is used as a pen width estimator although it will be recognized that other estimators may be used. For example, a pen width estimation may be derived by skeletonising the image within the block.

Starting with the blocks which are classified as TEXT, neighboring blocks are grouped together in step 230 if the median of the horizontal run length distribution is within a bounded variation. If there is any prior knowledge of what the pen-width should be, for example in applications designed only to handle typewritten envelopes, then this prior knowledge may be used to give a tighter bound on the pen-width estimator values and/or to identify blocks to be classified as TEXT.

Figure 3B:
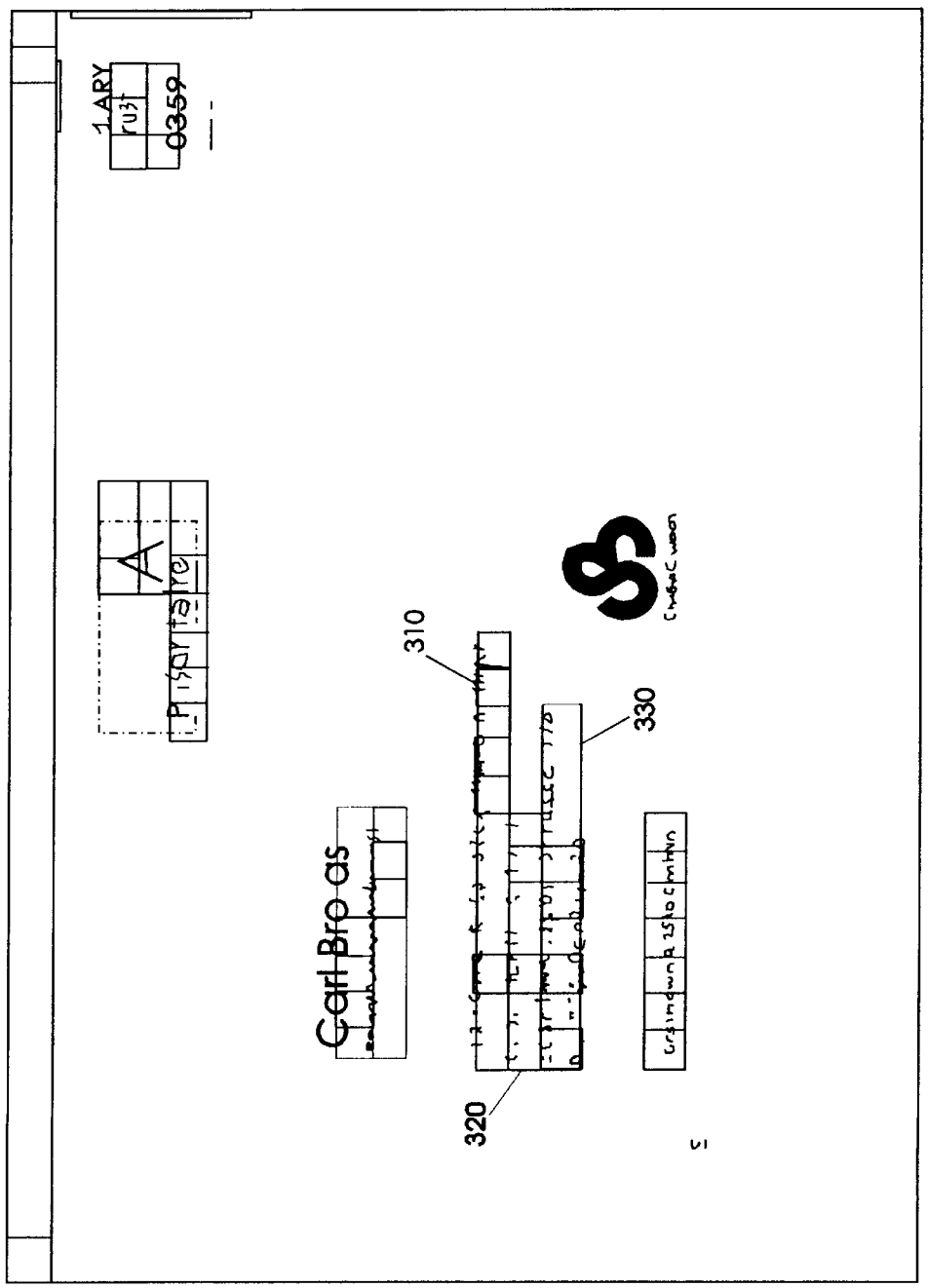

The result of this process is a series of horizontal lines of neighboring blocks. These are shown in FIG. 3B at, for example, ref numeral 310.

Next, in step 240 the lines of blocks are grouped vertically if they overlap by at least one block. In the example shown in FIG. 3B, horizontal lines 310, 320 and 330 are grouped together.

It will be appreciated that various line and region growing algorithms exist and may be used for the above tasks.

Then bounding rectangles of these vertically grouped blocks are generated in step 250 and used as address block candidates. The bounding rectangles are extended to include any connected component of the image which forms part of any block making up the group. Examples of such bounding rectangles are shown in FIG. 3C at, for example 340.

The address block candidates are scored using heuristic criteria and the candidate with the highest score is selected in step 260 as the address block location.

The preferred scoring process is as follows. A rectangle is assigned an initial score based on the distance of the center of the rectangle from the center of the envelope image. The closer to the center of the envelope the rectangle is, the higher the initial score. This score is reduced in certain special cases:
1. At least one of the edges of the rectangle is very close to the edge of the image;
2. A small or very high number of text rows is detected inside the rectangle. The text row analysis is carried out by performing a horizontal projection of the black pixels within each address block candidate, smoothing the projection function and finding extrema in the smoothed projection function. The number of rows is estimated from the number of local maxima in this smoothed projection.
3. The aspect ratio, i.e. the ratio between the width and height of the rectangle, is small. This excludes long and narrow rectangles.

Figure 3C:
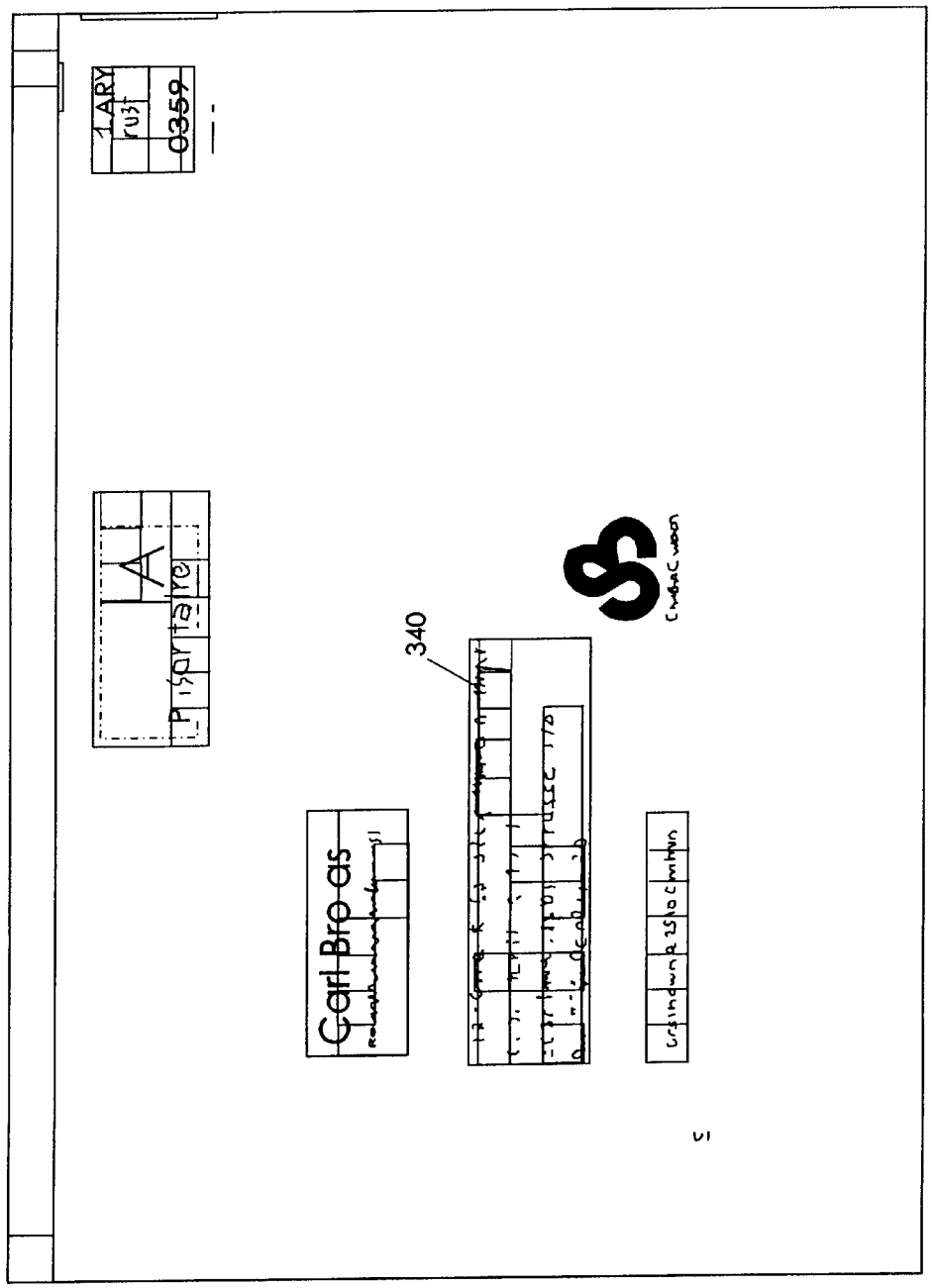

In the example shown in FIG. 3C, rectangle 340 is selected as the address block.

It will be appreciated that many other heuristic criteria, such as contour regularity, may also be used and that appropriate criteria may vary according to local addressing standards and conventions.

As will be clear from the above description, the present implementation of the invention may take the form of a computer program and can be distributed in the form of an article of manufacture comprising a computer usable medium, such as removable media 412, in which suitable program code is embodied for causing a computer, such as computer workstation 400, to perform the function of address block location system 160 described above.

As will also be clear from the above description, the present implementation of the invention may also take the form of a computer, such as computer workstation 400, which may access and run such a computer program to perform the function of address block location system 160 described above.

The invention is applicable to the industrial fields of image processing and automated mail handling.

While the invention has been particularly shown and described with reference to a preferred embodiment and process, it will be understood that various changes in form and detail may be made therein without departing from the spirit and scope of the invention.

What is claimed is:

1. A method, performed in a data processing system, for locating address indicia on digitized images of mail pieces, comprising the computer implemented steps of:

dividing the mail piece images into geometric blocks;

identifying rows of geometric blocks which are adjacent along a first direction and which have similar defined image features by constructing and comparing, within adjacent geometric blocks, a vector of image features constructed for each geometric block based on the image content within the block, including:

v0—number of black pixels in the block;
v1—median of the horizontal run length distribution for runs of black pixels within the block. Edge effects are ignored, i.e. runs that start in one block and end in another are assumed to be cut.
v2—average length of black runs in the block;
v3—median of the vertical run length distribution for vertical black runs in the block;
v4—horizontal run length variance estimator $$v2 = \sum_{horizontalruns} \{|(x\text{-}median)|\}/n$$

where n is the number of runs and x is the run-length;
v5—vertical run length variance estimator $$v5 = \sum_{verticalruns} \{|x\text{-}median|\}/n$$

v6—horizontal registration factor: correlation between original block and the block shifted horizontally by 2xv1;
v7—vertical registration factor: correlation between original block and the block shifted vertically by 2xv2; and
v8–v22—histogram of the horizontal run length in the block;

assembling at least some of said identified rows of geometric blocks, which identified rows being assembled are adjacent along a second direction perpendicular to said first direction, into address block candidate regions; and selecting an address block candidate region on the basis of defined criteria.

2. A method as claimed in claim 1 wherein the defined image features comprise a pen width estimator determined based on run lengths within the geometric blocks.

3. A method as claimed in claim 2 wherein the pen width estimator is the median of the run lengths within the geometric blocks.

4. A method as claimed in claim 1 further comprising the computer implemented step of
identifying a geometric block likely to contain text on the basis of vector of image features within the geometric block and wherein the computer implemented step of identifying rows of geometric blocks which are adjacent is carried out using a region growing process starting with a geometric block identified as likely to contain text.

5. A method as claimed in claim 4 wherein a geometric block is identified as likely to contain text by using a trainable pattern classifier to classify each geometric block as either containing text or not containing text.

6. A method as claimed in claim 1 wherein the geometric blocks have at least one dimension of between 10 and 20 pixels.

7. A method as claimed in claim 1 further comprising the computer implemented step of reducing the image resolution to between 50 and 100 dpi.

8. A method as claimed in claim 1 wherein the image is a binary image.

9. A method as claimed in claim 1 wherein the first direction is parallel to the direction of rows of text in an address.

10. A data processing system, for locating address indicia on digitized images of mail pieces, comprising:

means for dividing the mail piece images into geometric blocks;

means for identifying rows of geometric blocks which are adjacent along a first direction and which have similar defined image features by constructing and comparing, within adjacent geometric blocks, a vector of image features constructed for each geometric block based on the image content within the block, including:
v0—number of black pixels in the block;
v1—median of the horizontal run length distribution for runs of black pixels within the block. Edge effects are ignored, i.e. runs that start in one block and end in another are assumed to be cut.
v2—average length of black runs in the block;
v3—median of the vertical run length distribution for vertical black runs in the block;
v4—horizontal run length variance estimator $$v2 = \sum_{horizontalruns} \{|(x\text{-}median)|\}/n$$

where n is the number of runs and x is the run-length;
v5—vertical run length variance estimator $$v5 = \sum_{verticalruns} \{|x\text{-}median|\}/n$$

v6—horizontal registration factor: correlation between original block and the block shifted horizontally by 2xv1;
v7—vertical registration factor: correlation between original block and the block shifted vertically by 2xv2; and
v8–v22—histogram of the horizontal run length in the block;

means for assembling at least some of said identified rows of geometric blocks, which identified rows being assembled are adjacent along a second direction perpendicular to said first directions into address block candidate regions; and means for selecting an address block candidate region on the basis of defined criteria.

11. A data processing system as claimed in claim 10 wherein the defined image features comprise a pen width estimator determined based on run lengths within the geometric blocks.

12. A data processing system as claimed in claim 11 wherein the pen width estimator is the median of the run lengths within the geometric blocks.

13. A data processing system as claimed in claim 10 further comprising means for identifying a geometric block likely to contain text on the basis of vector of image features within the geometric block and wherein the computer implemented step of identifying rows of geometric blocks which are adjacent is carried out using a region growing process starting with a geometric block identified as likely to contain text.

14. A data processing system as claimed in claim 13 wherein a geometric block is identified as likely to contain text by using a trainable pattern classifier to classify each geometric block as either containing text or not containing text.

15. A data processing system as claimed in claim 10 wherein the geometric blocks have at least one dimension of between 10 and 20 pixels.

16. A data processing system as claimed in claim 10 further comprising means for reducing the image resolution to between 50 and 100 dpi.

17. A data processing system as claimed in claim 10 wherein the image is a binary image.

18. A data processing system as claimed in claim 10 wherein the first direction is parallel to the direction of rows of text in an address.

19. A computer program product, for use in a data processing system, the computer program product comprising:

- a computer usable medium having computer readable program code embodied in said medium for locating address indicia on digitized images of mail pieces, said computer program product including:
- computer readable program code means for dividing the mail piece images into geometric blocks;
- computer readable program code means for identifying rows of geometric blocks which are adjacent along a first direction and which have similar defined image features by constructing and comparing, within adjacent geometric blocks, a vector of image features constructed for each geometric block based on the image content within the block, including:
  - v0—number of black pixels in the block;
  - v1—median of the horizontal run length distribution for runs of black pixels within the block. Edge effects are ignored, i.e. runs that start in one block and end in another are assumed to be cut.
  - v2—average length of black runs in the block;
  - v3—median of the vertical run length distribution for vertical black runs in the block;
  - v4—horizontal run length variance estimator $$v2 = \sum_{horizontal runs} \{|(x-median)|\}/n$$

where n is the number of runs and x is the run-length;
  - v5—vertical run length variance estimator $$v5 = \sum_{vertical runs} \{|x-median|\}/n$$

- v6—horizontal registration factor: correlation between original block and the block shifted horizontally by 2xv1;
  - v7—vertical registration factor: correlation between original block and the block shifted vertically by 2xv2; and
  - v8–v22—histogram of the horizontal run length in the block;
- computer readable program code means for assembling at least some of said identified rows of geometric blocks, which identified rows being assembled are adjacent along a second direction perpendicular to said first direction, into address block candidate regions; and
- computer readable program code means for selecting an address block candidate region on the basis of defined criteria.

20. A computer program product as claimed in claim 19 wherein the defined image features comprise a pen width estimator determined based on run lengths within the geometric blocks.

21. A computer program product as claimed in claim 20 wherein the pen width estimator is the median of the run lengths within the geometric blocks.

22. A computer program product as claimed in claim 19 further comprising computer readable program code means for identifying a geometric block likely to contain text on the basis of vector of image features within the geometric block and wherein the computer implemented step of identifying rows of geometric blocks which are adjacent is carried out using a region growing process starting with a geometric block identified as likely to contain text.

23. A computer program product as claimed in claim 22 wherein a geometric block is identified as likely to contain text by using a trainable pattern classifier to classify each geometric block as either containing text or not containing text.

24. A computer program product as claimed in claim 19 wherein the Geometric blocks have at least one dimension of between 10 and 20 pixels.

25. A computer program product as claimed in claim 19 further comprising computer readable program code means for reducing the image resolution to between 50 and 100 dpi.

26. A computer program product as claimed in claim 19 wherein the image is a binary image.

27. A computer program product as claimed in claim 19 wherein the first direction is parallel to the direction of rows of text in an address.

* * * * *